(12) United States Patent
Parsons

(10) Patent No.: US 7,689,933 B1
(45) Date of Patent: Mar. 30, 2010

(54) METHODS AND APPARATUS TO PREVIEW CONTENT

(75) Inventor: Vincent L. Parsons, San Jose, CA (US)

(73) Assignee: Adobe Systems Inc., San Jose, CA (US)

( * ) Notice: Subject to any disclaimer, the term of this patent is extended or adjusted under 35 U.S.C. 154(b) by 484 days.

(21) Appl. No.: 11/273,645

(22) Filed: Nov. 14, 2005

(51) Int. Cl.
 *G06F 3/048* (2006.01)
(52) U.S. Cl. .................. 715/838; 715/788; 715/739; 715/200; 715/273; 715/274; 715/277
(58) Field of Classification Search ............... 715/838, 715/738, 739, 770, 788, 835, 853, 854, 200, 715/243, 251, 273, 274, 277; 707/3, 100
See application file for complete search history.

(56) References Cited

U.S. PATENT DOCUMENTS

| | | | |
|---|---|---|---|
| 6,262,732 B1* | 7/2001 | Coleman et al. | 715/835 |
| 6,496,206 B1* | 12/2002 | Mernyk et al. | 715/835 |
| 2001/0028368 A1* | 10/2001 | Swartz et al. | 345/835 |
| 2004/0194014 A1* | 9/2004 | Anwar | 715/500 |
| 2005/0210412 A1* | 9/2005 | Matthews et al. | 715/835 |
| 2005/0246640 A1* | 11/2005 | Lacy | 715/713 |
| 2006/0184540 A1* | 8/2006 | Kung et al. | 707/10 |
| 2006/0242164 A1* | 10/2006 | Evans et al. | 707/100 |
| 2006/0277167 A1* | 12/2006 | Gross et al. | 707/3 |
| 2007/0101294 A1* | 5/2007 | Fong et al. | 715/838 |
| 2008/0040690 A1* | 2/2008 | Sakai | 715/853 |

* cited by examiner

*Primary Examiner*—Weilun Lo
*Assistant Examiner*—Rashedul Hassan
(74) *Attorney, Agent, or Firm*—Chapin IP Law, LLC

(57) ABSTRACT

A display application herein allocates a first region of a display screen for displaying a list of content items such as documents or files. A respective viewer of the display screen can select multiple content items from the list. The display application highlights selected content items. For each of multiple selected content items, the display application displays a preview of corresponding sub-content such as a respective set of thumbnail images associated with a respective content item in an allocated second region of the display screen. The second region of the display screen includes one or more visual boundaries so that a user can identify groupings of related thumbnails associated with selected content items.

26 Claims, 7 Drawing Sheets

METHODS AND APPARATUS TO PREVIEW CONTENT

RELATED APPLICATION

This application is related to co-pending U.S. patent application entitled "METHODS AND APPARATUS FOR DISPLAYING METADATA," Ser. No. 11/273,646, filed on the same day as the present application, Nov. 14, 2005, the entire teachings of which are incorporated herein by this reference.

BACKGROUND

Software application programs have long been used to perform tasks for computer users. For example, one type of software application program such as Microsoft Windows Explorer™ supports navigation amongst a file system. In general, a file system is a program used by an operating system to organize and keep track of files. A hierarchical file system is one that uses directories to organize files into a tree structure. One purpose of the navigation software is to enable a viewer to identify and open files of interest in the hierarchical file system.

To manage a file system, a viewer can launch Microsoft Windows Explorer™ on a respective computer system to view directories of locally stored information. While in a directory, the viewer can choose a given folder for viewing. In response to choosing the given folder, the navigation software typically presents one or more files in the given folder that can be selected and opened by the viewer. The files can be stored according to different formats depending on a respective native application used to generate the file.

Microsoft Windows Explorer™ displays an icon of a particular type to represent the files in a folder. Based on the type of icon, a user can identify the native application used to generate the file. For example, the navigation software can display a WORD™ icon (e.g., a large letter "W") to indicate files encoded according to a WORD™ format. The navigation software displays a corresponding unique flowchart icon to identify files encoded according to a MICROGRAFX™ format, and so on.

SUMMARY

Conventional software navigation techniques are quite useful because they enable viewers to browse through a file system and identify content of interest based on metadata such as filenames, last modified dates, authors, etc. of corresponding documents stored in the file system. However, conventional software navigation techniques do not provide an easy way for a viewer to quickly view specific details associated with the actual content stored in a respective file without the viewer manually opening and searching the file for content of interest in a respective native application. Such a process can be quite time-consuming because, in addition to retrieving the document of interest from storage, the viewer might have to wait for a respective application to open before the viewer is able to review content associated with a selected document.

Also, the viewer may select one or more files of interest to review. Such files may be stored according to different types of formats that require launching of multiple different software applications for viewing. Thus, to review content associated with two or more different types of files (e.g., a WORD™ file, a WORD PERFECT™ file, a VISIO™ file, etc.), the viewer has to open and switch between using the two different applications to review respective content. Consequently, conventional navigation software has limited usefulness to a respective computer user.

Techniques discussed herein deviate with respect to conventional applications such as those discussed above as well as additional techniques also known in the prior art. In particular, certain embodiments herein are directed to displaying groupings of images (e.g., replica or reduced resolution images of original text-based documents, web pages, pictures, articles, slide shows, images, PDF files, etc. as they would appear in a native application) associated with corresponding content so that a viewer can more easily review content and identify matters of interest.

For example, a display application according to one embodiment herein includes allocating a first region of a display screen for displaying a list of content items such as multi-page documents or files. A respective viewer of the display screen can select multiple content items from the list.

After receiving selection of content items from the list, the display application provides a respective indication on the display screen of which of the selectable content items in the list have been selected. The selected content items can be a subset (i.e., fewer than all) of the content items in the list.

For each of multiple content items selected from the list, an allocated second region of the display screen includes a preview of corresponding sub-content such as a respective set of thumbnail images associated with a respective content item. The thumbnail images can be miniature, scaled down (e.g., reduced resolution) images of sub-content associated with a corresponding selected content item in the list as the content would appear if opened in a respective native application.

In one embodiment, the content item in the list identifies a multi-page document or file. The respective thumbnail images in the second region of the display screen depict each of the pages of the multi-page document. Accordingly, a viewer can view a miniaturized version of the pages of the multi-page document in the second region of the display screen without having to manually open the respective content in a native application (e.g., an application specifically designed to decode and display respective content to a viewer) and scroll through the document to view its corresponding content.

One aspect of the display application herein is to provide visual boundaries in the second region of the display screen so that a user can identify groupings of related thumbnails associated with selected content items. For example, as identified by one or more visual boundaries in the second region of the display screen, a first respective grouping of thumbnails corresponds to a respective first selected content item in the list, a second respective grouping of thumbnails corresponds to a respective second selected content item in the list, a third respective grouping of thumbnails corresponds to a respective third selected content item in the list, and so on.

Each respective set of thumbnail images in the second region of the display screen can include an identifier indicating to which content item the respective set of thumbnail images pertain. For example, a first grouping of thumbnail images can include an identifier associated with a corresponding first selected content item in the list, the second grouping of thumbnails includes an identifier associated with a corresponding second selected content item in the list, an so on. The viewer thus can identify a selected content item in the first region of the display screen and corresponding group of respective images related to the selected content in the second region of the display screen. Accordingly, images (e.g., the thumbnails) displayed in the second region of the display screen enables the viewer to quickly view sub-contents associated with selected content items without actually having to individually open and scroll through each the selected documents to find relevant subject matter. That is, instead of having to rely on conventional opening and scrolling techniques, the viewer can select content items and view a respective miniaturized version of sub-content (e.g., sub-portions such as pages) associated with each of the selected content items on the display screen at the same time.

As will be further discussed, the viewer can apply different types of functions to the thumbnail images displayed in the second region of the display screen. For example, in one embodiment, the display application herein provides a zoom function on the display screen to enable changing a respective size of the images appearing in the second allocated portion of the display screen. Accordingly, a viewer can increase a size of the thumbnails to view more details of the thumbnails displayed in the second region of the display screen or reduce a respective size of the thumbnails so that more thumbnails in a respective set of images associated with a content item are displayed on the display screen.

In another embodiment, the display application herein provides a filter function to enable filtering out of at least a portion of a respective grouping of images displayed in the second allocated portion of the display screen. Such a function enables a viewer of the display screen to select which subset or type of images in the respective grouping will continue to be displayed for a corresponding content item and which subset or type of the images in the respective grouping will no longer be displayed for the corresponding content item. Accordingly, the viewer can control which thumbnail images (associated with a respective content item in the list) are displayed in the second region of the display screen.

In yet another embodiment, the display application herein provides a search function to enable searching for a specified type of content associated with the grouping of images displayed in the second allocated portion of the display screen. In one embodiment, the search function is applied to content related to a respective grouping of thumbnail images in the second allocated portion of the display screen. Based on use of the search function, the viewer can quickly identify images in the second region of the display screen that meet respective search criteria.

In a further embodiment, the display application herein provides a view function associated with the second allocated portion of the display screen to enable a viewer to select how different types of thumbnail images or respective sub-content are displayed (e.g., ordered, presented, formatted, etc.) in the second allocated portion of the display screen. Accordingly, the viewer can view the sub-content in different ways depending on a selected view mode.

Additional embodiments herein include a computerized device, workstation, handheld or laptop computer, or the like configured with software and/or circuitry (e.g., a processor) to process any or all of the method operations disclosed herein. In other words, a computerized device, a processor, or logic circuitry that is programmed or configured to operate as explained herein is considered an embodiment herein. This latter embodiment provides a hardware platform on which to execute a display application according to embodiments herein.

Yet other embodiments herein include software programs to perform the steps and operations summarized above and disclosed in detail below. One such embodiment comprises a computer program product that has a computer-readable medium including computer program logic encoded thereon that, when performed in a computerized device having a memory, a processor, and a respective display screen, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present application is directed to a computer program product that includes a computer readable medium having instructions stored thereon for generating and displaying groups of one or more content images associated with selected content. The instructions, when carried out by a processor of a respective computer device, cause the processor to perform the steps of: i) in a first allocated portion of a display screen, displaying multiple content items; ii) while displaying the multiple content items in the first allocated portion of the display screen, displaying a preview of a respective set of images associated with each of the multiple content items in a second allocated portion of the display screen; and iii) displaying at least one visual boundary in the second allocated portion of the display screen to indicate groupings of the images associated with the multiple content items. Other embodiments of the present application include software programs to perform any of the method embodiment steps and operations summarized above and disclosed in detail below.

As discussed above, techniques herein are well suited for presenting a preview of content to a viewer for purposes of quickly identifying matters of interest. However, it should be noted that embodiments herein are not limited for use in such applications and that the techniques discussed herein are well suited for other purposes as well.

It is to be understood that the system according to an embodiment herein can be embodied strictly as a software program, as software and hardware, or as hardware alone such as within a processor, or within an operating system or a within a software application. Example embodiments of the invention may be implemented within products and/or software applications manufactured by Adobe Systems, Inc. of San Jose, Calif., USA. Additional features of the embodiments herein will be further discussed in the Detailed Description section of this application and accompanying figures.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to an example embodiment, a display application herein includes allocating a first region of a display screen for displaying a list of content items such as documents or files. A respective viewer of the display screen can select multiple content items from the list. The display application highlights selected content items. For each of multiple selected content items, the display application displays a preview of corresponding sub-content such as a respective set of thumbnail images associated with a respective content item in an allocated second region of the display screen. One aspect of the display application herein is to provide visual boundaries in the second region of the display screen so that a user can identify groupings of related thumbnails associated with selected items. For example, as identified by one or more visual boundaries in the second region of the display screen, a first respective grouping of images corresponds to a respective first selected content item in the list, a second respective grouping of images corresponds to a respective second selected content item in the list, a third respective grouping of images corresponds to a respective third selected content item in the list, and so on.

Each respective set of thumbnail images in the second region of the display screen can include an identifier indicating to which content item the respective set of thumbnail images pertain. For example, a first grouping of thumbnails can include an identifier associated with a corresponding first selected content item in the list, the second grouping of thumbnails includes an identifier associated with a corresponding second selected content item in the list, an so on. The viewer thus can identify which selected content item in the first region of the display screen as well as a corresponding group of respective images in the second region of the display screen. Images (e.g., the thumbnails) displayed in the second region of the display screen enables a viewer to quickly view sub-contents associated with simultaneously selected content items (e.g., documents) without actually having to individually open and scroll through each of the selected documents to find relevant subject matter. That is, instead of having to rely on conventional opening and scrolling techniques, the viewer can select content items in a list and view respective miniaturized version of sub-portions (e.g., pages) associated with each of the selected content items.

Figure 1:
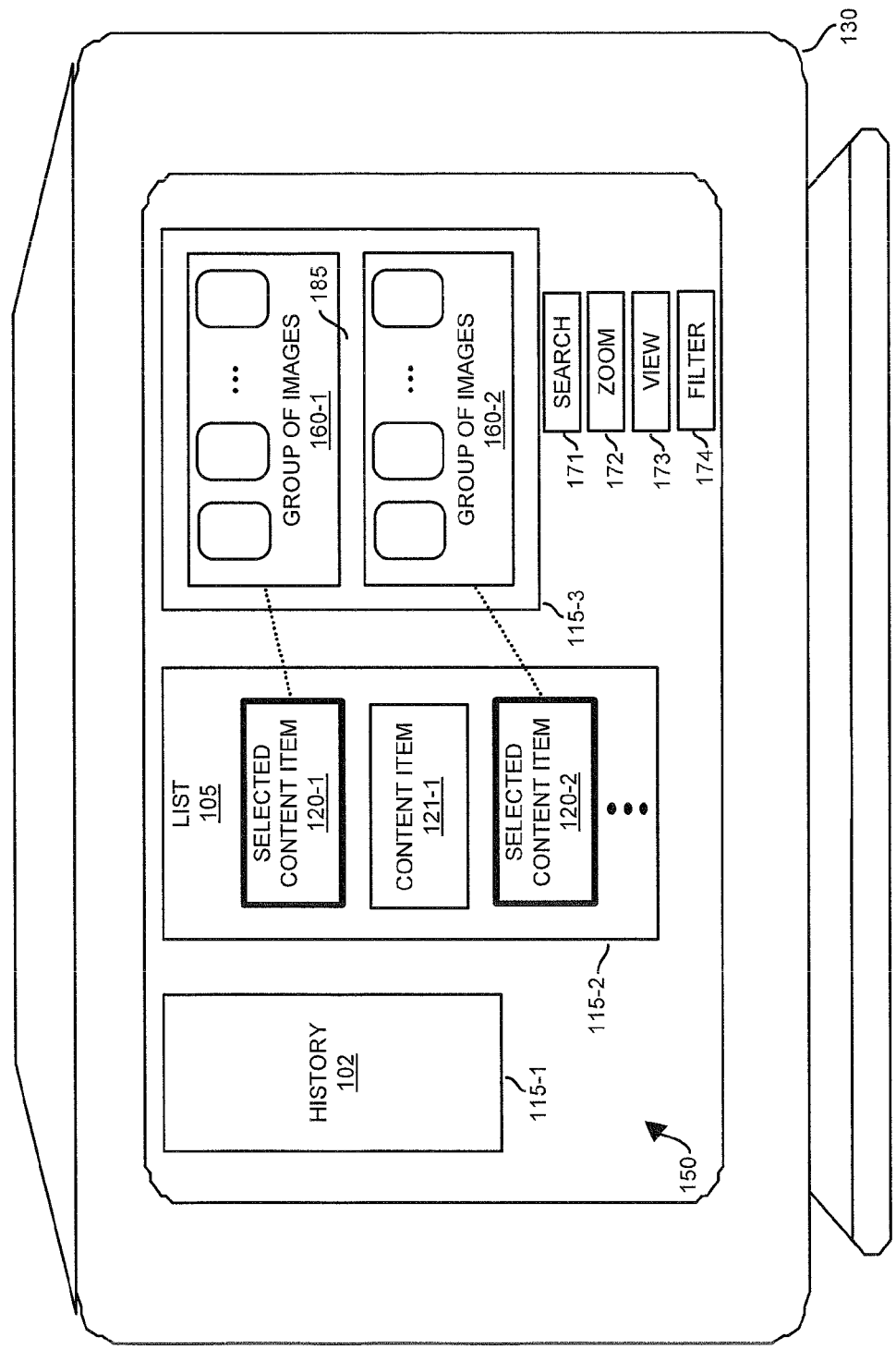
FIG. 1 is a diagram of a display screen including a graphical user interface according to an embodiment herein.

FIG. 1 is a diagram of display screen 130 displaying a graphical user interface 150 according to an embodiment herein. As shown, graphical user interface 150 includes display region 115-1, display region 115-2, and display region 115-3. Display region 115-1 displays a history 102 of previous user activity. Display region 115-2 includes list 105 of content item such as selected content item 120-1, content item 121-1, selected content item 120-2, and so on. As shown, list 105 can include additional selected content items and non-selected content items than shown. Display region 115-3 includes group of images 160-1 and group of images 160-2. The number of groups of images 160 displayed in display region 115-3 changes depending on how many content items are selected form list 105. Graphical user interface 150 on display screen 130 further includes search function 171, zoom function 172, view function 173, and filter function 174 for applying to selected content items and/or group of images 160 in respective display region 115-2 and 115-3.

In the context of a display application for previewing content, a respective display application generating graphical user interface 150 highlights (or provides a visual indication in relation to) selected content items 120 so that a viewer can identify which content items in list 105 have been selected. In addition to selected content items, the list 105 displays one or more non-selected and thus non-highlighted content items (such as content item 121-1). For a non-selected content item, there is no corresponding group of images 160 displayed in display region 115-3.

Each selected content item 120 has a corresponding group of images 160 that appear in display region 115-3. Selected content items can identify (remotely or locally stored) content such as files, slide shows, picture folders, text-based documents, web pages, etc. A respective group of images 160 in display region 115-3 associated with a corresponding selected content item includes images (e.g., thumbnail images) associated with the respective selected content item. In one embodiment, the thumbnail images are miniature images of respective pages, slides, pictures, text-based document pages, web page images associated with a respective selected content item displayed in display region 115-1.

Boundary 185 separates group of images 160 so that the user can distinguish the different groups of images 160 from each other. Further, the display application according to an embodiment herein provides a visual indication of an association between a selected content item 120 and corresponding group of images 160.

As an illustrative example of the techniques herein, the selected content item 120-1 in list 105 can be a multi-page document. In this case, the display application displays thumbnail images of each page of the multi-page document in display region 115-3. For example, the respective images in group of images 160-1 (e.g., thumbnail images of the pages) can be displayed in successive order according to respective page numbers associated with the thumbnail images. Consequently, based on viewing the group of images 160-1, the viewer can quickly identify which specific pages of the multi-page document include matters of interest.

When previewing content associated with selected content items 120, a viewer (or other entity analyzing contents of display screen 130) can apply different functions to identify content of interest. For example, the viewer can enlarge and reduce a size of images displayed in display region 115-3 via the zoom function 172. The viewer can search for specific content associated with the images displayed in display region 115-3. The viewer also can filter which of the images appear in display region 115-3. These functions will be discussed in greater detail later in this specification.

In yet a further embodiment, the graphical user interface 150 herein enables a viewer to modify contents displayed in display region 115-3. For example, the display application can support a modification operation enabling a viewer to drag and drop an image originally in the group of images 160-1 to the group of images 160-2 in display region 115-3. In response to such an operation, an underlying process associated with the display application initiates modification of the affected original files (e.g., content) so that the changes appear in the affected content when opened in a corresponding native application.

Another operation potentially supported by the display application herein is a copy and paste operation. For example, a viewer can copy one or more images in one group of images 160-1 displayed in display region 115-3 and paste the copied images in another group of images 160-2 in display region 115-3. In response to such an operation, an underlying process associated with the display application initiates modification of the affected original files (e.g., content) so that the changes appear in the identified content when opened in a corresponding native application.

The embodiment as discussed above can be extended to include another display region on display screen 130 for displaying information associated with selected content items. For example, the multi-page document discussed above can include multiple subsections of information such as articles that do not necessarily begin and end on a respective page. Based on input from viewer, the display application herein can be prompted to analyze content associated with the thumbnail images in the group of images 160-1 to identify logical groupings of content (e.g., articles) associated with the thumbnail images based on content type rather than page number. In such an embodiment, the display application displays the logical groupings of content associated with the thumbnail images in yet another allocated display region on the display screen 130. Accordingly, the viewer can simultaneously view pages of content in one section (e.g., display region 115-3) of display screen 130 and view different logical partitions of the selected content item in another display region of display screen 130.

Figure 2:
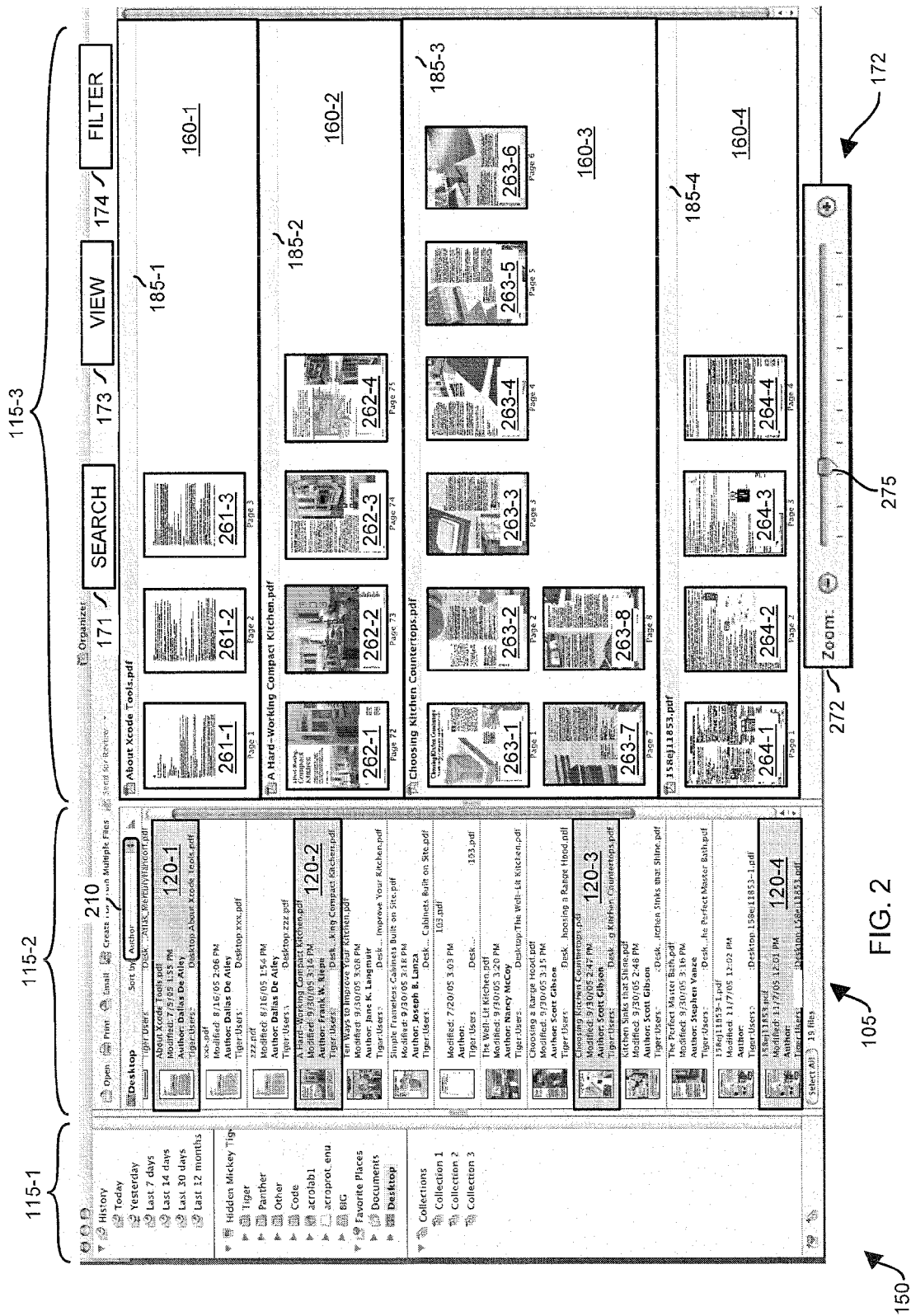
FIG. 2 is a detailed screenshot of graphical user interface according to an embodiment herein.

FIG. 2 is a more detailed diagram of graphical user interface 150 according to an embodiment herein. As shown, graphical user interface includes a display region 115-1, display region 115-2, and display region 115-3. Navigation and selection of icons in display region 115-1 enables a user to select one or more content items for inclusion in list 105. Sort function 210 associated with display region 115-2 enables the user to select how one or more content items in list 105 are displayed to a viewer. Details of the sort function 210 are further described in co-pending application entitled "METHODS AND APPARATUS FOR DISPLAYING METADATA," which has been incorporated herein by reference as discussed above. Note that if the selected content items 120 in list 105 are reordered as a result of sorting by another criteria, such as filename instead of author, the groups of images 160 are also resorted. Accordingly, the ordering of selected content items in display region 115-2 matches a respective ordering of corresponding group of images 160 in display region 115-3.

In one embodiment, each of the content items in list 105 of display region 115-2 includes a corresponding image associated with a respective content item displayed to a viewer. The corresponding image is a thumbnail image of the first page of the respective content item (e.g., the first page of a multi-page document) in list 105. When a specific content item (e.g., a multi-page document) in the list 105 is selected by a viewer, the display application herein automatically displays a portion or all respective pages (e.g., corresponding thumbnail images) of the selected document in display region 115-3 as a respective group of images 160. Accordingly, selection of a content item in list 105 enables a viewer to quickly view other related pages associated with a respective selected content item.

As discussed above, display region 115-3 includes a display of group of images 160 associated with the selected content items 120. For example, selected content item 120-1 includes 3 pages of content as identified by respective image 261-1 (e.g., page 1), image 261-2 (e.g., page 2), and image 261-3 (e.g., page 3); selected content item 120-2 includes 4 pages of content as identified by respective image 262-1 (e.g., page 1), image 262-2 (e.g., page 2), image 262-3 (page 3), and image 262-4 (e.g., page 4); and so on. Each selected content item 120 includes a corresponding image of a first page of the respective multi-page document so that a viewer can quickly see at least a first page of a respective document displayed in the list 105.

Note that the selected content items 120 in list 105 need not be of the same file type. For example, a first one of the selected content items 120 can be encoded according to a PDF (Portable Document Format) format, another one of the selected content items 120 can be encoded according to WORD™, another one of the selected content items 120 can be encoded according to Word Perfect™ and so on. Thus, according to one embodiment herein, graphical user interface 150 enables a respective viewer to review and manage different types of files via use of a common software management application. To view a respective selected content item 120 in a native respective application, the viewer can click on either the selected content item 120 or one or more of a respective group of images 160 displayed in display region 115-3.

In one embodiment, all (or part) of the images in display region 115-3 include a respective page identifier so that the viewer can identify on what page the different content appears in a respective original document identified by the corresponding selected content item 120. The images of pages associated with the respective selected content item 120 are listed in sequential order from lowest to highest, left to right on the display screen 130.

Display region 115-3 includes boundary 185-1, boundary 185-2, boundary 185-3, and boundary 185-4. Boundary 185-2 separates group of images 160-2 from group of images 160-1; boundary 185-3 separates group of images 160-3 from group of images 160-2, and so on. Accordingly, the viewer can quickly recognize different groups of images 160.

As discussed above, zoom function 172 enables a viewer to enlarge or reduce a size associated with any or all of the images in display region 115-3. For example, zoom function 172 includes zoom slider bar 272. The display application herein displays a corresponding icon 275 that appears to slide, based on user input, along the zoom slider bar 172. Sliding the icon 275 along the zoom slider bar 272 enables the viewer to change the respective size of the images appearing in display region 115-3. Movement of the icon 275 in a direction toward the "plus" sign along the zoom slider bar 272 increases a size of the images (e.g., images 261, images 262, images 263, ... ) in display region 115-3. Movement of the icon 275 in a respective opposite direction toward the "minus" sign along the zoom slider bar 272 reduces a size of the images in display region 115-3. Accordingly, if a viewer cannot find content of interest because the images are too small, the viewer can increase a respective size of the images. Conversely, if the viewer wishes to view more thumbnail images in display region 115-3, the user can reduce a size of the respective images in display region 115-3.

After the viewer identifies particular content of interest in the images displayed in display region 115-3, the viewer can click (e.g., double click) on a respective image to initiate viewing the selected content item in a respective native application. As an example, assume that the display application herein receives an indication of a selected image 261-2 from, e.g., group of images 160-1 associated with selected content item 120-1. In response to receiving the indication of the selected image 261-2, the display application initiates (local or remote) retrieval of content associated with the selected content item 120-1. The display application then automatically displays the retrieved content associated with content item 120-1 in a corresponding application on the display screen 130 for viewing by the user. In one embodiment, the native application automatically displays the retrieved content at a position corresponding to the selected image 261-2. That is, the native application automatically scrolls to page 2 of the selected content item 120-1 for viewing by the user. Accordingly, the viewer can identify the presence of content of interest in the context of a preview management application (e.g., graphical user interface 150 that can display thumbnail images of many different types of documents) and, thereafter, initiate viewing of the content of interest without having to manually open the selected content item in a native application and scroll through the native application to find the content of interest.

Figure 3:
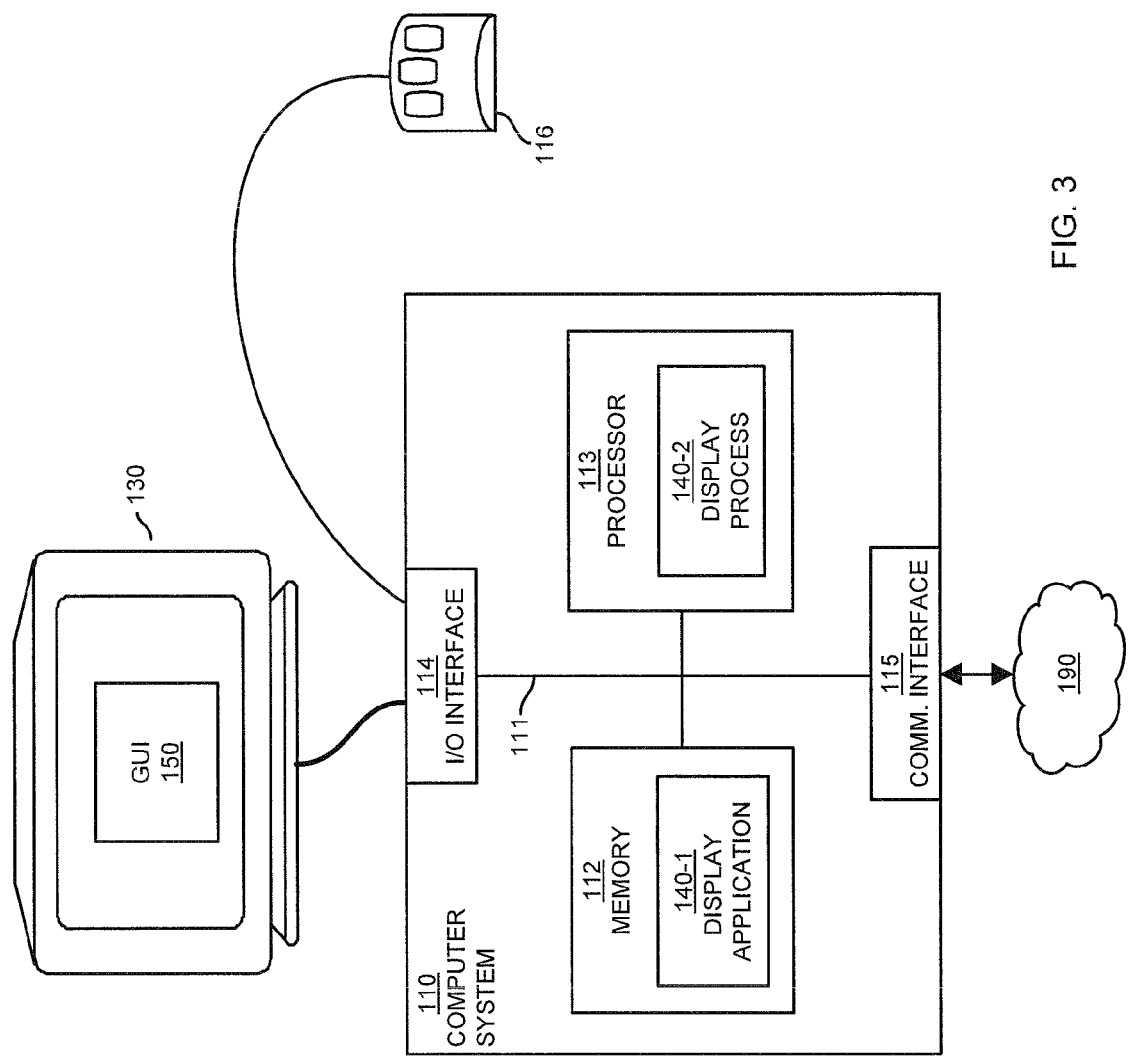
FIG. 3 is a block diagram of a processing device suitable for executing a display application according to an embodiment herein.

FIG. 3 is a block diagram of a computer environment 300 illustrating an example computer architecture for implementing a display application 140-1 according to embodiments herein. Computer system 110 can be a computerized device such as a personal computer, workstation, portable computing device, console, network terminal, processing device, etc. As shown, computer system 110 of the present example includes an interconnect 111 that couples a memory system 112, a processor 113, I/O interface 114, and a communications interface 115 coupled to network 190 such as a LAN or WAN (e.g., the Internet). I/O interface 114 potentially provides connectivity to peripheral devices 116 such as a keyboard, mouse, display screens, etc. Communications interface 115 enables computer system 110 to communicate over network 190 to retrieve and transmit information from remotely located sources if necessary.

As shown, memory system 112 is encoded with a display application 140-1 that enables a user to preview content. Display application 140-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the display application 140-1. Execution of the display application 140-1 produces processing functionality in display process 140-2. In other words, the display process 140-2 represents one or more portions of the display application 140-1 performing within or upon the processor 113 of computer system 110.

It should be noted that, in addition to the display process 140-2 as previously discussed, embodiments herein include the display application 140-1 itself (i.e., the un-executed or non-performing logic instructions and/or data). The display application 140-1 can be stored on a computer readable medium such as a floppy disk, hard disk or in an optical medium. According to other embodiments, the display application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of display application 140-1 in processor 113 as the display process 140-2. Thus, those skilled in the art will understand that the computer system 110 can include other processes and/or software and hardware components, such as an operating system that enables a respective user to launch the display application 140 and preview selected content according to embodiments herein.

Functionality supported by computer system 110 and, more particularly, functionality associated with display application 140-1 and display process 140-2 will now be discussed via flowcharts in FIGS. 4 through 7. For purposes of this discussion, computer system 110 or display application 140 (e.g., display application 140-1 and/or display process 140-2) each can perform the processing steps in the flowcharts.

Note that there will be some overlap with respect to concepts discussed above for FIGS. 1-3. Also, note that the steps in the below flowcharts need not always be executed in the order shown.

Figure 4:
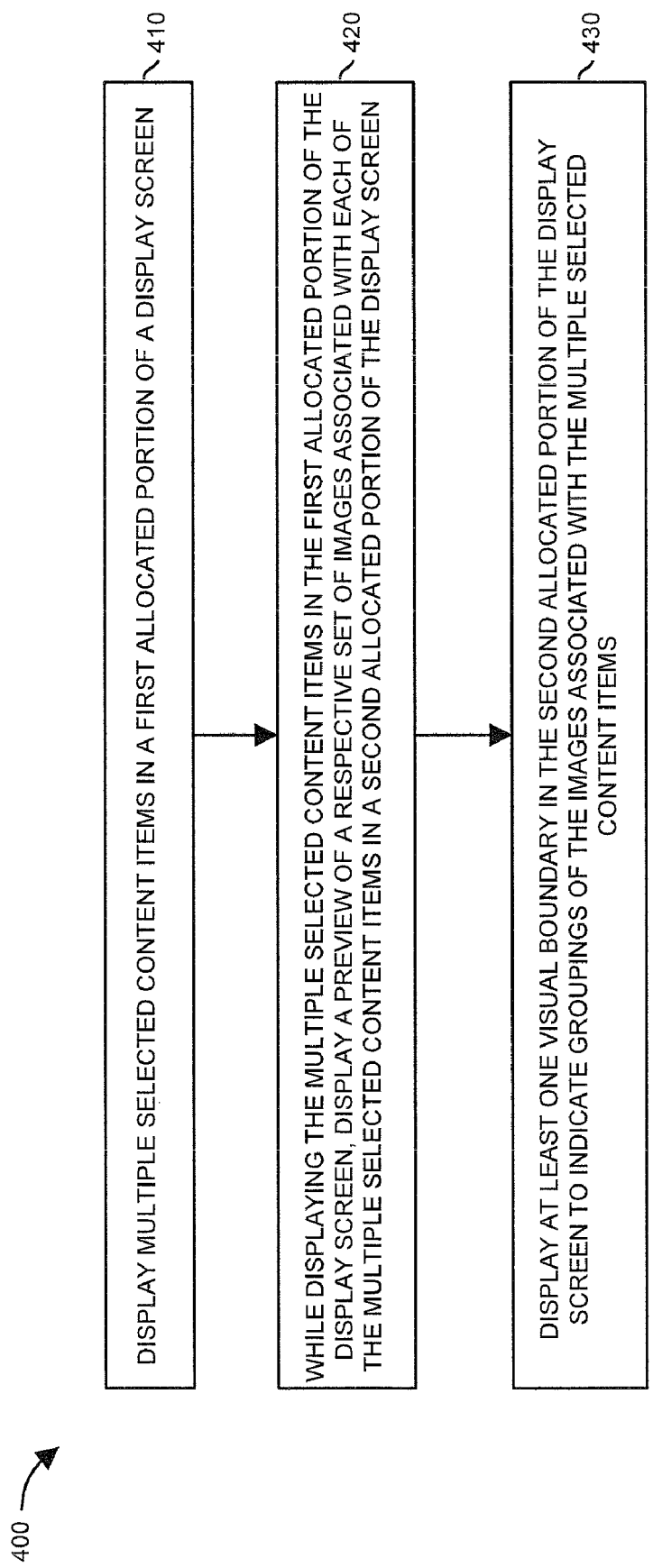
FIG. 4 is a flowchart illustrating techniques associated with previewing content according to an embodiment herein.

FIG. 4 is a flowchart 400 illustrating a technique for previewing content according to an embodiment herein. In one embodiment, selected content can be previewed in a non-native environment using thumbnail renditions of content according to an embodiment herein. Note that flowchart 400 of FIG. 4 will include references to matter previously discussed with respect to FIGS. 1-3.

In step 410, display application 140-1 displays multiple content items in a first allocated portion (e.g., display region 115-2) of display screen 130.

In step 420, while displaying the multiple content items in the first allocated portion of the display screen 130, display application 140-1 displays a preview of a respective group of images 160 associated with each of the selected content items 120 in a second allocated portion (e.g., display region 115-3) of the display screen 130.

In step 430, display application 140-1 displays at least one visual boundary 185 in the second allocated portion (e.g., 115-2) of the display screen 130 to indicate groupings of the images 160 associated with the multiple selected content items 120.

Figure 5:
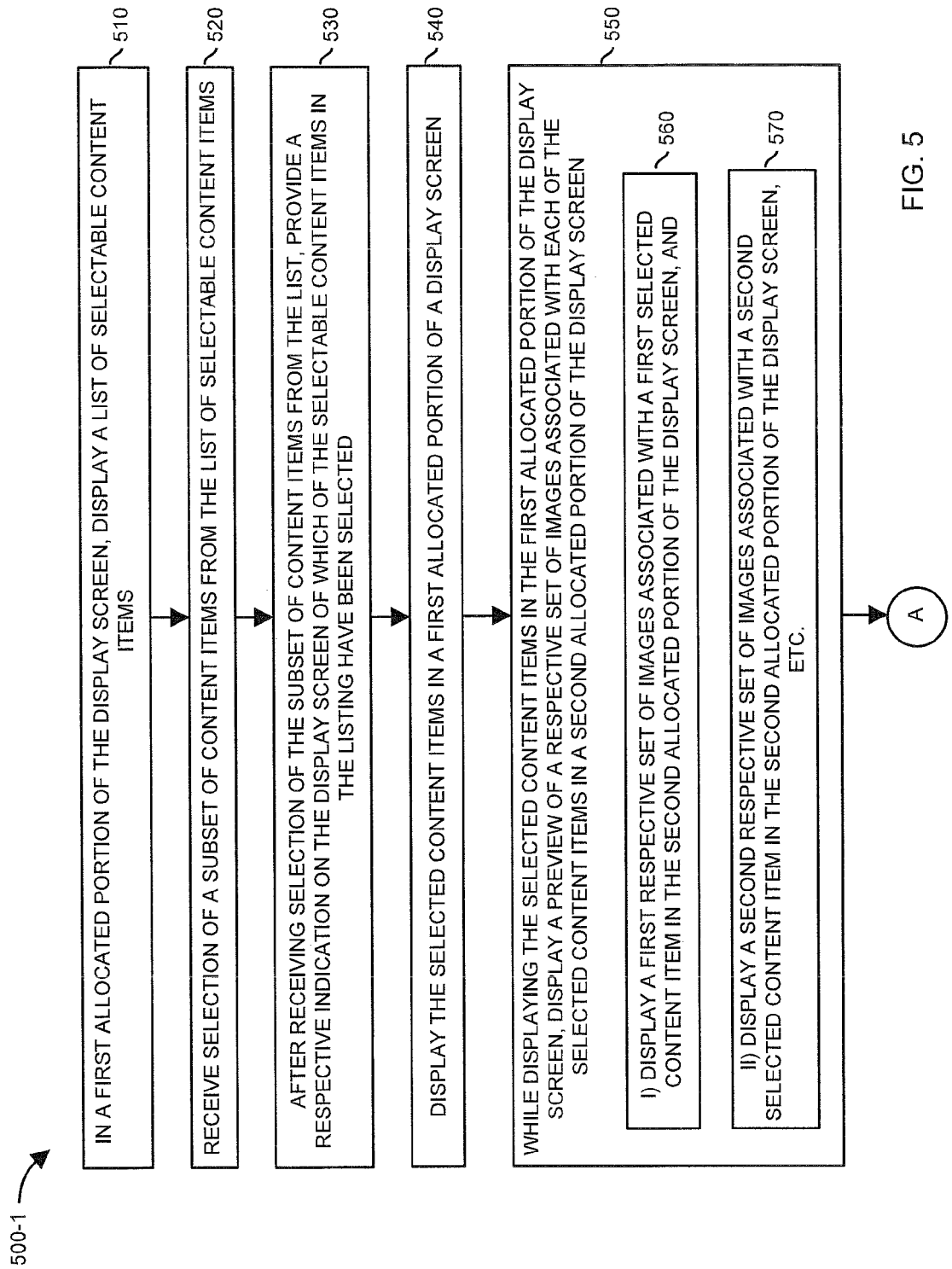
FIGS. 5 and 6 combine to form a more detailed flowchart illustrating techniques for previewing content according to an embodiment herein.
Figure 6:
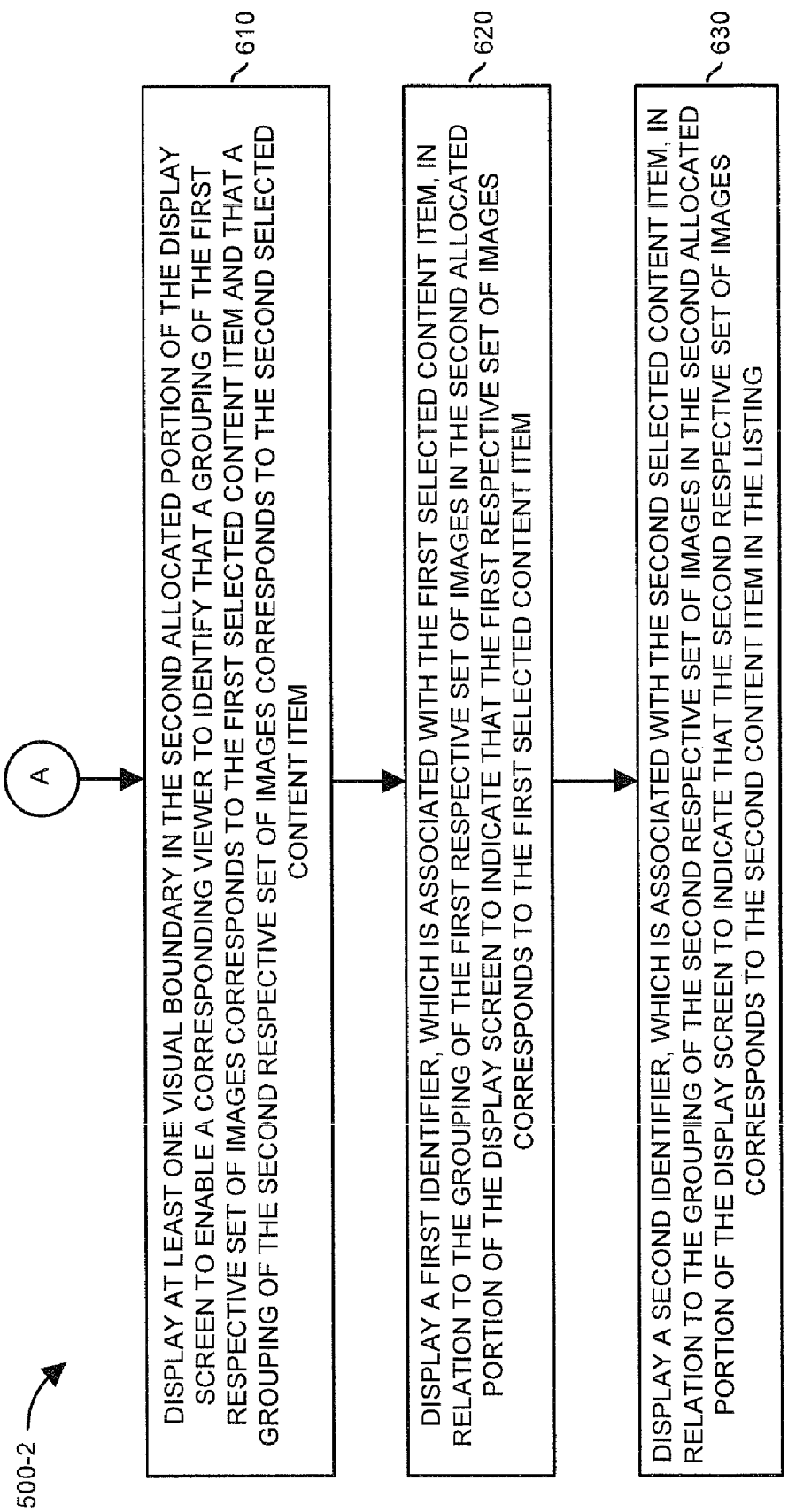

FIGS. 5 and 6 combine to form a flowchart 500 (e.g., flowchart 500-1 and flowchart 500-2) illustrating more specific techniques according to embodiments herein. Note that according to one embodiment, the steps in flowchart 500 are performed by computer system 110 or display application 140-1 (as shown in FIG. 3) but such functionality can be extended to other platforms as well.

In step 510 of 500-1 of FIG. 5, in display region 115-2 of display screen 130, display application 140-1 displays a list 105 of selectable content items.

In step 520, display application 140-1 receives selection of a subset of content items from the list 105 of selectable content items.

In step 530, after receiving selection of the subset of content items from the list 105, the display application 140-1 provides a respective indication on the display screen 130 of which content items in the list 105 have been selected.

In step 540, display application 140-1 displays the selected content items 120 in display region 115-2 of display screen 130.

In step 550, while displaying the selected content items 120 in display region 115-2 of display screen 130, the display application 140-1 displays a preview of a respective group of images 160 associated with each of the selected content items 120 in display region 115-3 of the display screen 130.

In step 560, display application 140-1 displays a first respective group of images 160-1, associated with selected content item 120-1, in display region 115-2 of the display screen 130.

In step 570, display application 140-1 displays a second respective group of images 160-2 associated with a second selected content item 120-2.

In step 610 of flowchart 500-2 of FIG. 6, display application 140-1 displays at least one visual boundary 185 in display region 185 of the display screen 130 to enable a corresponding viewer to identify that a grouping of the first respective set of images 160-1 corresponds to the first selected content item 120-1 and that a grouping of the second respective set of images 160-2 corresponds to the second selected content item 120-2.

In step 620, display application 140-1 displays a respective identifier (e.g., "About Xcode Tools.pdf"), which is associated with the first selected content item 120-1, in relation to the grouping of the first respective set of images 160-1 to indicate that the first respective set of images 160-1 corresponds to the first selected content item 120-1.

In step 630, display application 140-1 displays a second identifier (e.g., "A Hard-Working Compact Kitchen.pdf"), which is associated with the second selected content item 120-2, in relation to the grouping of the second respective set of images 160-2 to indicate that the second respective set of images 160-2 corresponds to the second content item 120-2 in the list 105.

Figure 7:
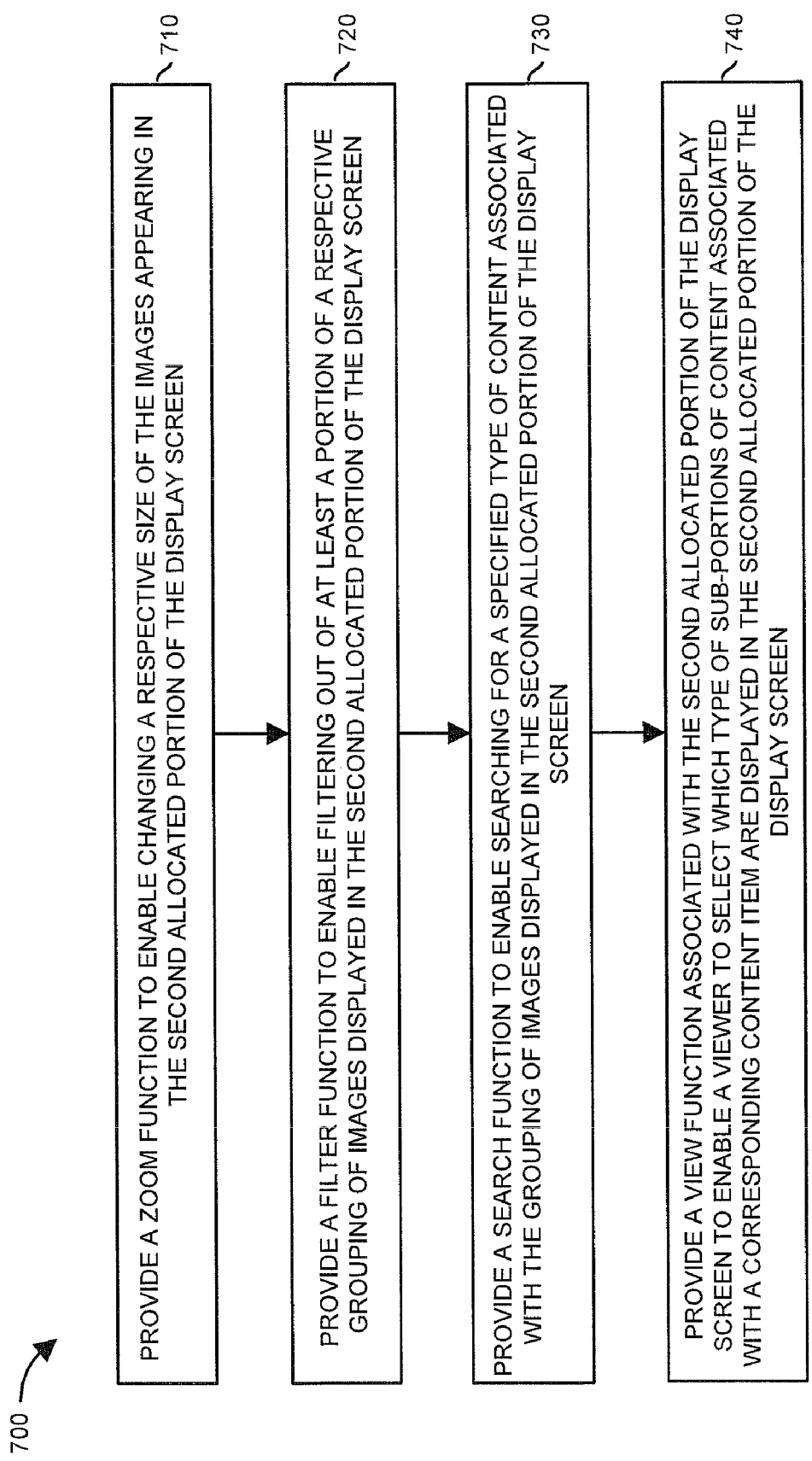
FIG. 7 is a flowchart illustrating functions that can be applied to manipulate a display of content according to an embodiment herein.

FIG. 7 is a flowchart 700 of additional techniques associated with previewing content according to embodiments herein. Note that according to the present embodiment, the steps in flowchart 700 are be performed by computer system 110 or display application 140-1 as discussed above.

In step 710, display application 140-1 displays a zoom function 172 to enable changing a respective size of images appearing in display region 115-3 of display screen 130. Details of the zoom function 172 were discussed above with respect to FIGS. 1 and 2.

In step 720, display application 140-1 displays a filter function 174 to enable filtering out at least a portion of a respective grouping of images 160 displayed in display region 115-3. For example, in one embodiment, the filter function 174 enables a viewer of the display screen 130 to select which subset of the images in a respective grouping of images 160 will continue to be displayed for a corresponding selected content item 120 in list 105 and which portion of the images in the respective grouping of images 160 will no longer be displayed for the corresponding selected content item 120.

As an example, referring to FIG. 2 again, suppose that a viewer wishes to view content associated with granite countertops in the group of images 160-3. In one embodiment, the viewer can utilize the filter function 174 to filter out any pages (e.g., images 263) of the selected content item 120-3 that do not pertain to granite countertops. In such an example, the user would provide filter criteria such as "granite." In response to receiving this search criteria, display application would filter out any images in group of images 160-3 that do not pertain to granite countertops. For example, if image 263-2 and image 263-3 were the only images related to granite countertops, then the display application would continue to display only image 263-2 and image 263-3 (because these pages include information about granite) in group of images 160-3 so that the viewer can more easily find content of interest. Filter function 174 can be applied to actual content such as text in the underlying content associated with the group of images 160-3 or corresponding metadata associated with the group of images 160-3 or selected content item 120-3.

In step 730, display application 140-1 displays a search function 171 (potentially overlapping with the filter function 174) to enable searching for a specified type of content associated with a respective one or more grouping of images 160 in display region 115-3 of display screen 130. As discussed above for the filter function 174, criteria associated with the search function 171 is applied to the content related to a respective grouping of images 160. In one embodiment, the display application herein highlights (e.g., via color, shading, etc.) images in display region 115-3 that correspond to inputted search criteria so that a viewer can identify which of the images in a respective group of images 160 or selected content items 120 in list 105 include content of interest as identified by the search criteria. Based on use of highlighting techniques, display application need not remove any of the images in display region 115-3 from viewing to indicate to a viewer which images fit into a respective search criteria because relevant images are highlighted.

In step 740, display application 140-1 displays a view function associated with the display region 115-3 of the display screen 130 to enable a viewer to select which type of sub-portions of content associated with a corresponding content item will be displayed in display region 115-3. In other words, a selected content item 120 in display region 115-2 can indicate respective content that is potentially sub-divided in a number of different ways. As discussed, one type of content apportionment is breaking up a respective document into pages as they appear in a respective native application associated with the content. Additionally, a document can be broken up based on other criteria (e.g., logical partitions) such as by article, author of articles, subject matter, etc. Accordingly, similar to sort function 210 associated with display region 115-2, the view function 173 enables the viewer to select a format of how sub-content (e.g., pages, articles, etc.) associated with a respective selected content item 120 will appear in display region 115-3.

Note again that techniques herein are well suited for presenting a preview of content to a viewer for purposes of quickly identifying matters of interest. However, it should be noted that embodiments herein are not limited to use in such applications and that the techniques discussed herein are well suited for other purposes as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method for previewing a visual representation of content, the method comprising:

in a first allocated portion of a display screen, displaying multiple selected content items wherein the multiple selected content items represent respective multi-page documents;

while displaying the multiple selected content items in the first allocated portion of the display screen, displaying thumbnail images of pages of each of the multi-page documents represented by the corresponding selected content items in a second allocated portion of the display screen wherein the thumbnail images are displayed side-by-side in a non-overlapping manner that allow preview of pages of each of the multi-page documents individually and concurrently;

displaying multiple visual boundaries in the second allocated portion of the display screen to indicate multiple groupings of the thumbnail images to identify which grouping corresponds to which of the multiple selected content items;

supporting at least one of:

i) an operation of dragging and dropping a thumbnail image, in a first grouping of the groupings of thumbnail images corresponding to a first content item of the selected content items to a second grouping of the groupings of thumbnail images corresponding to a second content item of the selected content items in the second allocated portion of the display screen to modify contents of the first content item and the second content item, so that changes appear in the respective original multi-page document files associated with the first content item and the second content item when opened in a corresponding native application, the modified content of the multi-page document file associated with the first content item corresponding to the modified content associated with the first content item as arranged in the first grouping, the modified content of the multi-page document file associated with the second content item corresponding to the modified content associated with the second content item as arranged in the second grouping; and ii) an operation of copying a thumbnail image in a first grouping of the groupings of thumbnail images corresponding to a first content item of the selected content items to a second grouping of the groupings of thumbnail images corresponding to a second content item of the selected content items in the second allocated portion of the display screen to modify content of the second content item, so that changes appear in the original multi-page document file associated with the second content item when opened in a corresponding native application, the modified content of the multi-page document file associated with the second content item corresponding to the modified content associated with the second content item as arranged in the second grouping.

2. A method as in claim 1 further comprising:
prior to displaying the multiple content items:
in the first allocated portion of the display screen, displaying a listing of selectable content items; and
receiving a selection of a subset of content items from the listing of selectable content items; and
wherein displaying the multiple content items includes displaying the subset of content items in the second allocated portion of the display screen.

3. A method as in claim 2 further comprising:
after receiving the selection of the subset of content items from the listing, providing a respective indication of which of the selectable content items in the listing have been selected as part of the subset of content items; and
wherein the preview includes initiating, in the second allocated portion of the display screen, display of images associated with the subset of content items.

4. A method as in claim 1 further comprising:
highlighting the first content item and the second content item as a subset of selected content items from a listing of a group of selectable content items displayed in the first allocated portion of the display screen, the listing including at least one non-highlighted content item that has not been selected for viewing corresponding thumbnail images in the second allocated portion of the display screen;
displaying a first identifier, which is associated with the first content item, in relation to the first grouping of the groupings of thumbnail images to indicate that the first grouping of the groupings of thumbnail images corresponds to the first content item in the listing; and
displaying a second identifier, which is associated with the second content item, in relation to the second grouping of the groupings of thumbnail images to indicate that the second grouping of the groupings of thumbnail images corresponds to the second content item in the listing.

5. A method as in claim 1 further comprising:
displaying a zoom function on the display screen to enable changing a respective size of the thumbnail images appearing in the second allocated portion of the display screen.

6. A method as in claim 5, wherein displaying the zoom function includes:
displaying a zoom slider bar on the display screen; and
displaying a corresponding icon that appears to slide, based on user input, along the zoom slider bar to enable changing the respective size of the thumbnail images appearing in the second allocated portion of the display screen, movement of the icon in one direction along the zoom slider bar increases a size of the thumbnail images and movement of the icon in a respective opposite direction along the zoom slider bar reduces a size of the thumbnail images.

7. A method as in claim 1 further comprising:
providing a filter function to enable filtering out of at least a portion of a respective grouping of thumbnail images displayed in the second allocated portion of the display screen, the filter function enabling a viewer of the display screen to select which subset of the thumbnail images in the respective grouping will continue to be displayed for a corresponding content item in the first allocated portion of the display screen and which subset of the thumbnail images in the respective grouping will no longer be displayed for the corresponding content item.

8. A method as in claim 7, wherein the filter function enables the viewer to limit what type of thumbnail images are displayed in the respective grouping of thumbnail images associated with the corresponding content item.

9. A method as in claim 1, wherein the first content item is a multi-page document and wherein displaying the first grouping of thumbnail images associated with the multi-page document includes displaying, in a respective portion of the second allocated portion of the display screen, thumbnail images of respective pages of the multi-page document in successive order according to respective page numbers associated with the thumbnail images.

10. A method as in claim 9 further comprising:
analyzing content associated with the thumbnail images in the respective portion of the second allocated portion of the display screen to identify logical groupings of content associated with the thumbnail images based on content type rather than page number; and
in a third allocated portion of the display screen, displaying the logical groupings of content associated with the thumbnail images.

11. A method as in claim 1 further comprising:
for a first grouping of thumbnail images that is displayed in the second allocated portion of the display screen and is associated with a first content item in the first allocated portion of the display screen, receiving an indication of a selected thumbnail image of the first grouping of thumbnail images;
in response to receiving the indication of the selected thumbnail image, initiating retrieval of content associated with the first content item; and
displaying the retrieved content in a corresponding application on the display screen such that the application automatically displays the retrieved content on the display screen at a position corresponding to the selected thumbnail image.

12. A method as in claim 1 further comprising:
providing a view function associated with the second allocated portion of the display screen to enable a viewer to select which type of sub-portions of content associated with a corresponding content item are displayed in the second allocated portion of the display screen.

13. A method as in claim 1 further comprising:
for a selected content item associated with the multiple selected content items, wherein the selected content item is a multi-page document, identifying a set of images associated with the selected content item, each image in the set of images being a visual rendering of a respective page of the selected content item; and
in the second allocated portion of the display screen, displaying the set of images in sequential order according to page numbers associated with the set of images.

14. A method as in claim 13 further comprising:
in the first allocated portion of the display screen associated with the selected content item, displaying an image of a first page associated with the multi-page document.

15. A method as in claim 1 further comprising:
providing a search function to enable searching for a specified type of content associated with the groupings of thumbnail images displayed in the second allocated portion of the display screen, the search function being applied only to content related to a respective grouping of thumbnail images in the second allocated portion of the display screen.

16. A method as in claim 15, wherein the search function, after execution of a respective search using the search function, highlights specific thumbnail images in the respective grouping of thumbnail images to indicate content that meets search criteria of the respective search.

17. A computer program product including a computer-readable medium having instructions stored thereon for processing data information, such that the instructions, when carried out by a processing device, enable the processing device to perform the operations of:
in a first allocated portion of a display screen, displaying multiple selected content items wherein the multiple selected content items represent respective multi-page documents;
while displaying the multiple selected content items in the first allocated portion of the display screen, displaying thumbnail images of pages of each of the multi-page documents represented by the corresponding selected content items in a second allocated portion of the display screen wherein the thumbnail images are displayed side-by-side in a non-overlapping manner that allow preview of pages of each of the multi-page documents individually and concurrently;
displaying multiple visual boundaries in the second allocated portion of the display screen to indicate multiple groupings of the thumbnail images to identify which grouping corresponds to which of the multiple selected content items;
supporting at least one of:
i) an operation of dragging and dropping a thumbnail image, in a first grouping of the groupings of thumbnail images corresponding to a first content item of the selected content items to a second grouping of the groupings of thumbnail images corresponding to a second content item of the selected content items in the second allocated portion of the display screen to modify contents of the first content item and the second content item, so that changes appear in the respective original multi-page document files associated with the first content item and the second content item when opened in a corresponding native application, the modified content of the multi-page document file associated with the first content item corresponding to the modified content associated with the first content item as arranged in the first grouping, the modified content of the multi-page document file associated with the second content item corresponding to the modified content associated with the second content item as arranged in the second grouping; and
ii) an operation of copying a thumbnail image in a first grouping of the groupings of thumbnail images corresponding to a first content item of the selected content items to a second grouping of the groupings of thumbnail images corresponding to a second content item of the selected content items in the second allocated portion of the display screen to modify content of the second content item, so that changes appear in the original multi-page document file associated with the second content item when opened in a corresponding native application, the modified content of the multi-page document file associated with the second content item corresponding to the modified content associated with the second content item as arranged in the second grouping.

18. A computer program product as in claim 17, the computer program product further supporting operations of:
highlighting the first content item and the second content item as a subset of selected content items from a listing of a group of selectable content items displayed in the first allocated portion of the display screen, the listing including at least one non-highlighted content item that has not been selected for viewing corresponding thumbnail images in the second allocated portion of the display screen;
displaying a first identifier, which is associated with the first content item, in relation to the first grouping of the groupings of thumbnail images to indicate that the first grouping of the groupings of thumbnail images corresponds to the first content item in the listing; and
displaying a second identifier, which is associated with the second content item, in relation to the second grouping of the groupings of thumbnail images to indicate that the second grouping of the groupings of thumbnail images corresponds to the second content item in the listing.

19. A computer program product as in claim 17, the computer program product further supporting operations of:
displaying a zoom function on the display screen to enable changing a respective size of the thumbnail images appearing in the second allocated portion of the display screen.

20. A computer program product as in claim 19, wherein displaying
the zoom function includes:
displaying a zoom slider bar on the display screen; and
displaying a corresponding icon that appears to slide, based on user input, along the zoom slider bar to enable changing the respective size of the thumbnail images appearing in the second allocated portion of the display screen, movement of the icon in one direction along the zoom slider bar increases a size of the thumbnail images and movement of the icon in a respective opposite direction along the zoom slider bar reduces a size of the thumbnail images.

21. A computer program product as in claim 17, wherein the first content item is a multi-page document and wherein displaying the first grouping of thumbnail images associated with the multi-page document includes displaying, in a respective portion of the second allocated portion of the display screen, thumbnail images of respective pages of the multi-page document in successive order according to respective page numbers associated with the thumbnail images.

22. A computer program product as in claim 17, the computer program product further supporting operations of:
provisioning a search function to enable searching for a specified type of content associated with the groupings of thumbnail images displayed in the second allocated portion of the display screen, the search function being applied only to content related to a respective grouping of thumbnail images in the second allocated portion of the display screen.

23. A computer program product as in claim 22, wherein the search function, after execution of a respective search using the search function, highlights specific thumbnail images in the respective grouping of thumbnail images to indicate content that meets search criteria of the respective search.

24. A computer system for previewing content, the computer system comprising:
a processor;
a memory unit that stores instructions associated with an application executed by the processor; and
an interconnect coupling the processor and the memory unit, enabling the computer system to execute the application and perform operations of:
in a first allocated portion of a display screen, displaying multiple selected content items wherein the multiple selected content items represent respective multi-page documents;
while displaying the multiple selected content items in the first allocated portion of the display screen, displaying thumbnail images of pages of each of the multi-page documents represented by the corresponding selected content items in a second allocated portion of the display screen wherein the thumbnail images are displayed side-by-side in a non-overlapping manner that allow preview of pages of each of the multi-page documents individually and concurrently;
displaying multiple visual boundaries in the second allocated portion of the display screen to indicate multiple groupings of the thumbnail images to identify which grouping corresponds to which of the multiple selected content items;
supporting at least one of:
i) an operation of dragging and dropping a thumbnail image, in a first grouping of the groupings of thumbnail images corresponding to a first content item of the selected content items to a second grouping of the groupings of thumbnail images corresponding to a second content item of the selected content items in the second allocated portion of the display screen to modify contents of the first content item and the second content item, so that changes appear in the respective original multi-page document files associated with the first content item and the second content item when opened in a corresponding native application, the modified content of the multi-page document file associated with the first content item corresponding to the modified content associated with the first content item as arranged in the first grouping, the modified content of the multi-page document file associated with the second content item corresponding to the modified content associated with the second content item as arranged in the second grouping; and
ii) an operation of copying a thumbnail image in a first grouping of the groupings of thumbnail images corresponding to a first content item of the selected content items to a second grouping of the groupings of thumbnail images corresponding to a second content item of the selected content items in the second allocated portion of the display screen to modify content of the second content item, so that changes appear in the original multi-page document file associated with the second content item when opened in a corresponding native application, the modified content of the multi-page document file associated with the second content item corresponding to the modified content associated with the second content item as arranged in the second grouping.

25. A computer system as in claim 24 that further performs operations of:
for a first content item of the multiple selected content items, identifying a first set of images associated with the first content item, each image in the first set of images being a visual rendering of a respective page of the first selected content item;
in the second allocated portion of the display screen, displaying the first set of images in sequential order according to respective page numbers associated with the first set of images;
for a second content item of the multiple selected content items, identifying a second set of images associated with the second content item, each image in the second set of images being a visual rendering of a respective page of the second selected content item; and
in the second allocated portion of the display screen while simultaneously displaying the first set of images, displaying the second set of images in sequential order according to respective page numbers associated with the second set of images.

26. The method of claim 1 wherein displaying a preview of a respective set of images associated with each of the multiple selected content items in a second allocated portion of the display screen wherein the set of images is pages of a multi-page document comprises:
displaying a respective page identifier near a portion of the set of images wherein the respective page identifier indicates a page number associated with the pages of the multi-page document represented by the set of images.

* * * * *